US008859899B2

(12) United States Patent
Skrypka et al.

(10) Patent No.: US 8,859,899 B2
(45) Date of Patent: Oct. 14, 2014

(54) ELECTRICAL CONNECTOR FOR CABLES

(75) Inventors: Volodymyr M. Skrypka, Santa Rosa, CA (US); Roger C. Williams, Santa Rosa, CA (US)

(73) Assignee: ITT Manufacturing Enterprises, LLC, Wilmington, DE (US)

( * ) Notice: Subject to any disclaimer, the term of this patent is extended or adjusted under 35 U.S.C. 154(b) by 257 days.

(21) Appl. No.: 13/370,494

(22) Filed: Feb. 10, 2012

(65) Prior Publication Data

US 2013/0206474 A1 Aug. 15, 2013

(51) Int. Cl.
*H02G 15/08* (2006.01)

(52) U.S. Cl.
USPC .................................... 174/88 R; 174/84 R

(58) Field of Classification Search
USPC ................ 174/88 R, 84 R, 91; 439/296, 796
See application file for complete search history.

(56) References Cited

U.S. PATENT DOCUMENTS 3,597,726 A * 8/1971 Appleton et al. ............ 439/724
3,697,935 A * 10/1972 Drapkin ..................... 439/744
3,794,959 A 2/1974 Kamolz
4,362,352 A * 12/1982 Hawkins et al. ............. 439/788
4,586,774 A 5/1986 Didier
4,586,776 A 5/1986 Ollis et al.
4,776,816 A * 10/1988 Herscovici et al. .......... 439/744
5,041,027 A 8/1991 Lien
5,203,805 A 4/1993 Cairns
5,376,025 A 12/1994 Willnat et al.
5,591,039 A * 1/1997 Matthews .................... 439/181
6,162,082 A 12/2000 Karsten et al.
6,208,158 B1 3/2001 Schein et al.
6,561,268 B2 5/2003 Jones
7,070,463 B2 7/2006 Arai et al.
7,108,547 B2 * 9/2006 Kisling et al. ............... 439/578
7,405,358 B2 7/2008 Emerson
7,726,997 B2 6/2010 Kennedy et al.
7,980,873 B2 * 7/2011 Emerson ..................... 439/191
8,388,375 B2 * 3/2013 Chawgo et al. .............. 439/578
8,449,325 B2 * 5/2013 Wild et al. ................... 439/578

FOREIGN PATENT DOCUMENTS

DE 198 04 453 A1 8/1999
EP 0 525 486 A2 2/1993

OTHER PUBLICATIONS

International Search Report, dated May 23, 2013, corresponding to International Application No. PCT/US2013/023112, filed Jan. 25, 2013.

* cited by examiner

*Primary Examiner* — Angel R Estrada
*Assistant Examiner* — Dimary Lopez Cruz
(74) *Attorney, Agent, or Firm* — RatnerPrestia

(57) ABSTRACT

A kit for splicing two electrical cable assemblies together includes an electrical connector and a plurality of pin contacts, each of which are configured to be connected to a wire of a cable assembly and inserted into the connector. The electrical connector includes a plurality of socket contacts that are each configured to be non-releasably connected to one of the plurality of pin contacts. Each socket contact of the electrical connector includes a bore for receiving a respective pin contact. The bore is configured to permit translation of a respective pin contact after the respective pin contact is non-releasably connected to its respective socket contact so as to accommodate a variable length of the cable assembly wire to which the respective pin contact is attached while maintaining electrical continuity between the respective pin contact of the cable assembly and the respective socket contact of the electrical connector.

21 Claims, 8 Drawing Sheets

ELECTRICAL CONNECTOR FOR CABLES

TECHNICAL FIELD

This invention generally relates to a kit for connecting two cable assemblies together including an electrical connector and electrical pin contacts.

BACKGROUND OF THE INVENTION

Electrical connectors are frequently used to connect one cable assembly to another cable assembly in order to transmit power, ground or signals between the cable assemblies. For cable assemblies including a bundle of wires, the length dimension of each wire can vary as a result of manufacturing tolerances. Additionally, the length of each wire may also vary due to thermal expansion, contraction or crimping a contact onto the wire.

The process of fixedly mounting each wire to the electrical connector is made difficult when the length dimension of each wire varies by more than an acceptable amount. If a particular wire of a cable assembly that is connected to a common connector is even slightly longer than the remaining wires of that cable assembly, then the remaining interconnected wires of that cable assembly may be too short to reach the common connector. Alternatively, if a particular wire of a cable assembly that is connected to a common connector is even slightly shorter than the remaining unconnected wires of that cable assembly, then it may be impossible to connect the unconnected wires to the common connector, or, it may be necessary to bend and stress the remaining unconnected wires of the cable assembly in order to connect them to the common connector. Bending the cables may be detrimental to their life span or their performance. Disclosed herein is a connector that is capable of compensating for the length tolerances of the cable assembly wires.

SUMMARY OF THE INVENTION

According to one aspect of the invention, an electrical connector is configured to accommodate varying wire lengths of a cable assembly to which the electrical connector is non-releasably connected. The electrical connector comprises a plurality of socket contacts that are each configured to be non-releasably connected to a respective pin contact that is attached to a wire of the cable assembly. Each socket contact of the connector includes a bore for receiving a respective pin contact. The bore of each socket contact is configured to permit translation of the respective pin contact after the respective pin contact is non-releasably connected to its respective socket contact so as to accommodate a variable length of the cable assembly wire to which the respective pin contact is attached while maintaining electrical continuity between the respective pin contact of the cable assembly and the respective socket contact of the electrical connector.

According to another aspect of the invention, a kit for splicing two electrical cable assemblies together includes an electrical connector and a plurality of pin contacts, each of which are configured to be connected to a wire of a cable assembly. The electrical connector includes a plurality of socket contacts that are each configured to be non-releasably connected to one of the plurality of pin contacts. Each socket contact of the electrical connector includes a bore for receiving a respective pin contact. The bore is configured to permit translation of a respective pin contact after the respective pin contact is non-releasably connected to its respective socket contact so as to accommodate a variable length of the cable assembly wire to which the respective pin contact is attached while maintaining electrical continuity between the respective pin contact of the cable assembly and the respective socket contact of the electrical connector.

The above-described contact systems may also be utilized in single wire applications. In such single wire applications the misalignment with different wire lengths may not be an issue, but the contact system accommodates extended tolerances in absolute length, as well as extended thermal expansion and contraction. More particularly, according to yet another aspect of the invention, an electrical connector is configured to accommodate varying wire lengths of a single wire assembly to which the electrical connector is non-releasably connected. The electrical connector comprises a socket contact that is configured to be non-releasably connected to a pin contact that is attached to a wire of the wire assembly. The socket contact of the connector includes a bore for receiving the pin contact. The bore of said socket contact is configured to permit translation of the pin contact after the pin contact is non-releasably connected to the socket contact so as to accommodate various lengths of wire to which the respective pin contact is attached while maintaining electrical continuity between the pin contact of the wire assembly and the socket contact of the electrical connector.

These and other aspects of the present invention will become clear from the detailed discussion below when taken into consideration with the drawings. It is to be understood that the following discussion is intended merely to illustrate the preferred embodiment of the present invention. However, the present invention is not limited to the illustrated embodiment, but is limited solely by the claims appended to this specification.

BRIEF DESCRIPTION OF THE FIGURES

The invention is best understood from the following detailed description when read in connection with the accompanying drawing. It is emphasized that, according to common practice, the various features of the drawing are not to scale. Included in the drawing are the following figures.

DETAILED DESCRIPTION OF THE INVENTION

Figure 1:
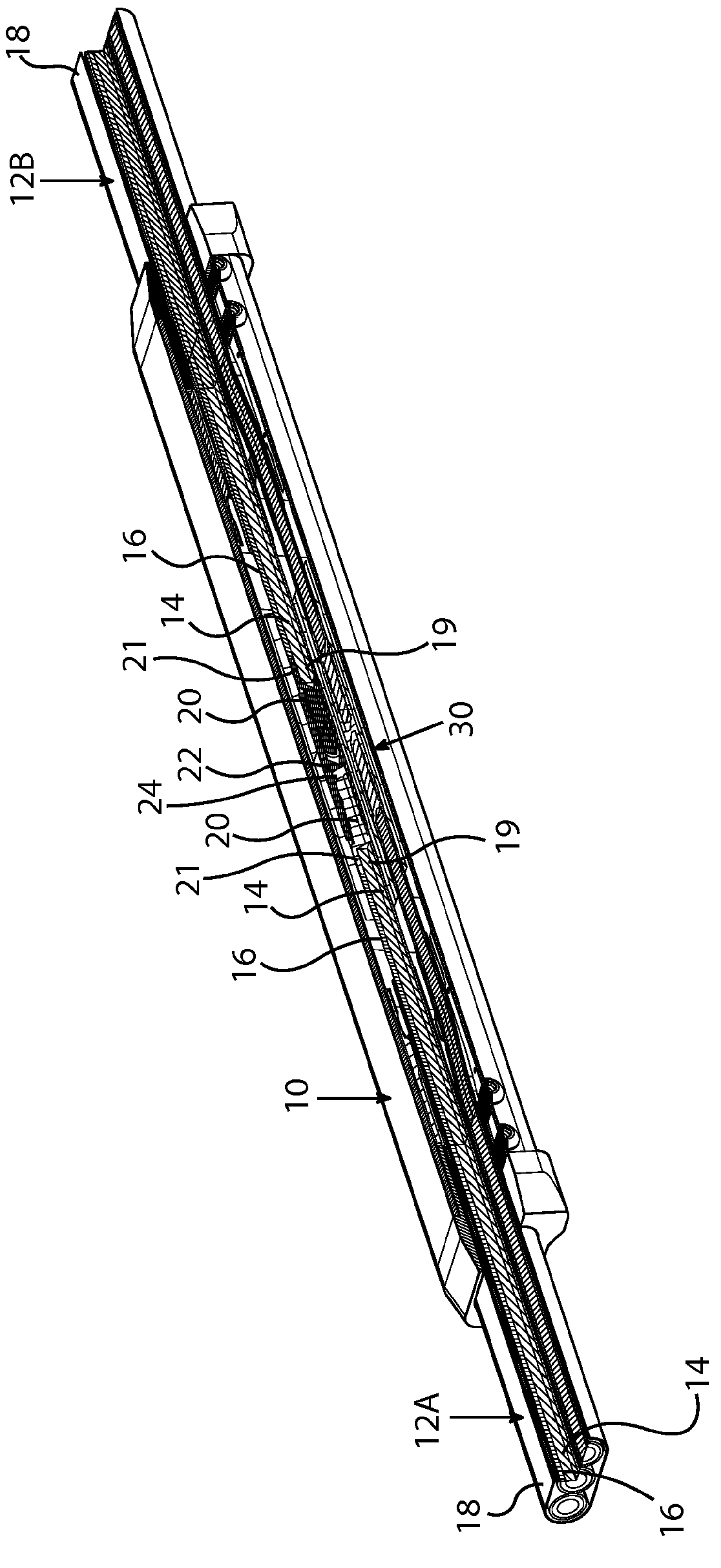
FIG. 1 depicts a perspective and partial cross-sectional view of an electrical connector mated to two cable assemblies, according to one exemplary embodiment of the invention.

The invention will next be illustrated with reference to the figures. Such figures are intended to be illustrative rather than limiting and are included herewith to facilitate explanation of the present invention. In the figures, like item numbers refer to like elements throughout.

Referring generally to the figures, and according to one aspect of the invention, an electrical connector 10 is configured to accommodate varying wire lengths of a cable assembly 12A, 12B to which the electrical connector 10 is non-releasably connected. The electrical connector 10 comprises a plurality of socket contacts 22 that are each configured to be non-releasably connected to a respective pin contact 20 that is attached to a wire 14 of the cable assembly 12A, 12B. Each socket contact 22 of the connector 10 includes a bore 24 for receiving a respective pin contact 20. The bore 24 of each socket contact 22 is configured to permit translation of the respective pin contact 20 after the respective pin contact 20 is non-releasably connected to its respective socket contact 22 so as to accommodate a variable length of the cable assembly wire 14 to which the respective pin contact 20 is attached while maintaining electrical continuity between the respective pin contact 20 of the cable assembly 12A, 12B and the respective socket contact 22 of the electrical connector 10.

Figure 2:
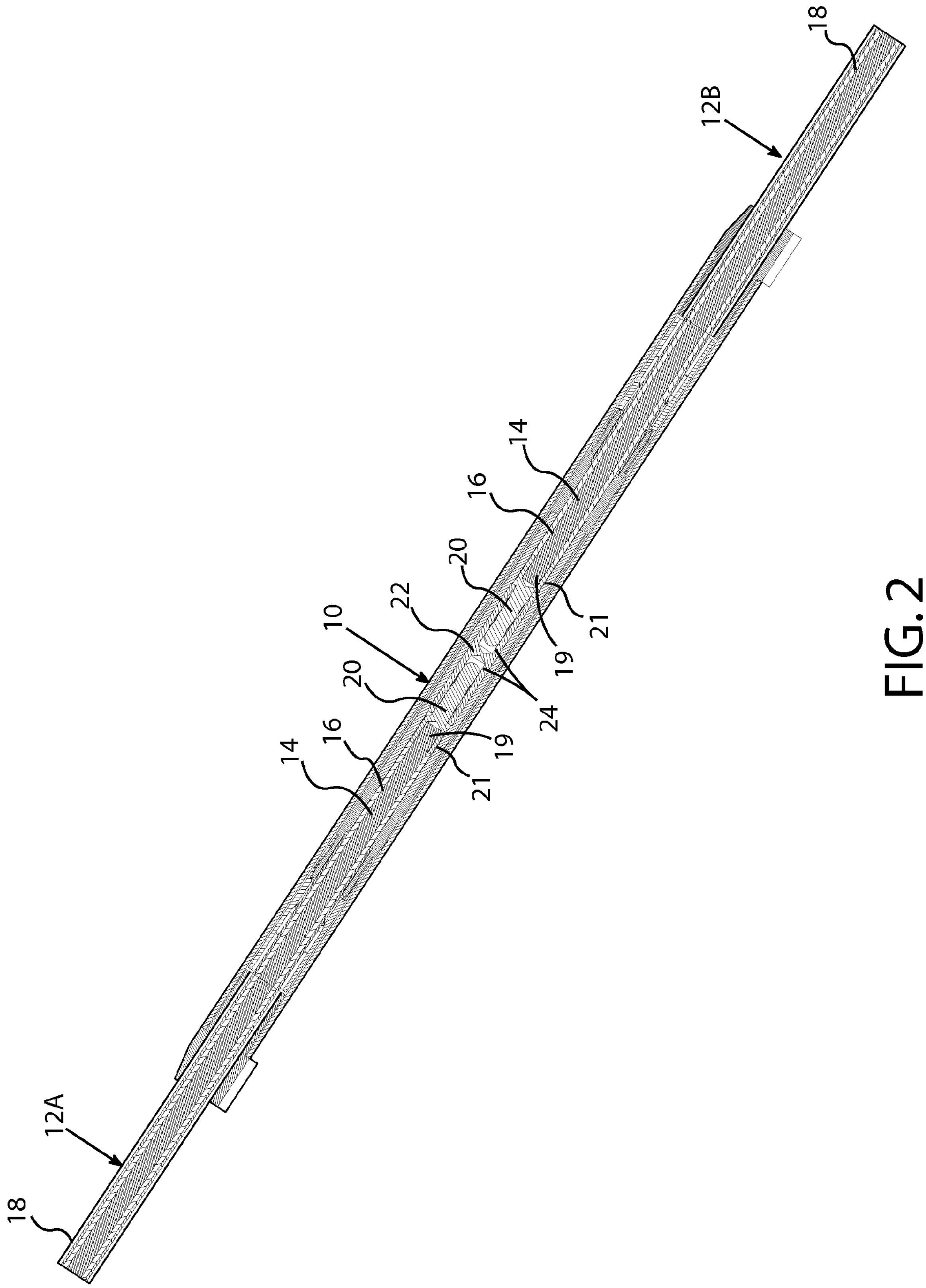
FIG. 2 depicts a side cross-sectional view of the electrical connector assembly mated to two cable assemblies of FIG. 1, wherein the cross-section is taken through the longitudinal center of the assembled components.

Referring now to FIGS. 1 and 2, those figures depict perspective and a side cross-sectional views, respectively, of an electrical connector assembly 10 (referred to as connector 10, hereinafter) mated to two cable assemblies 12A and 12B, according to one exemplary embodiment of the invention.

Each cable assembly 12A and 12B (referred to individually and/or collectively as cable assemblies 12) include a plurality (three shown) of wires 14. Each wire 14 is partially encased in a dielectric shield 16 and the dielectric shields 16 of each cable assembly 12 are all partially encased in an outer jacket 18. The wires 12 of each cable assembly 12 are interconnected by the outer jacket 18. Each cable assembly 12A and 12B may also include other conductive, dielectric and/or insulative layers that are positioned radially interior of the outer jacket 18. The size of each wire 14 may be AWG 1, AWG 2, AWG 4 or AWG 6, for example. Each cable assembly 12 may have a round cross-section (not shown) or a flat cross-section (as shown). The cable assemblies 12A and 12B may be part of an electric submersible pump/motor assembly, for example, or any other application.

As best depicted in FIG. 2, each wire 14 of the cable assembly 12A is electrically connected to a corresponding wire 14 of cable assembly 12B via the connector 10. Specifically, the exposed end 19 of each wire 14 is positioned in a blind hole that is defined in a hollow end 21 of a respective pin contact 20. The exposed end 19 of each wire 14 is attached to the hollow end 21 of a respective pin contact 20. Each pin contact 20 is non-removably mounted in a bore 24 that is defined in a socket contact 22, as will be described with reference to FIGS. 7A and 7B. The socket contacts 22 of the connector 10 maintain electrical continuity between the opposing pin contacts 20 that are mounted therein.

Figure 3:
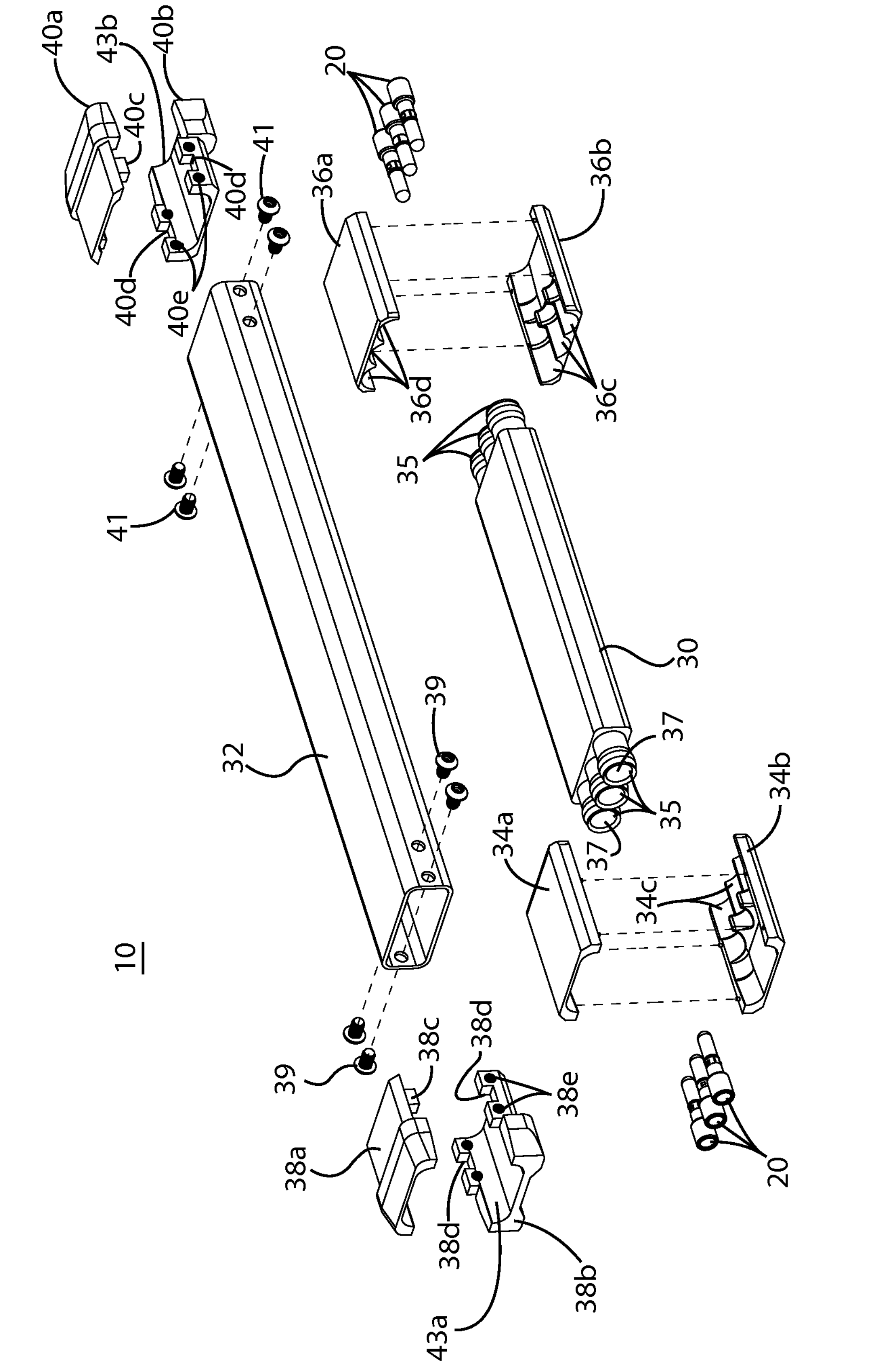
FIG. 3 depicts an exploded view of the electrical connector of FIG. 1.
Figure 4:
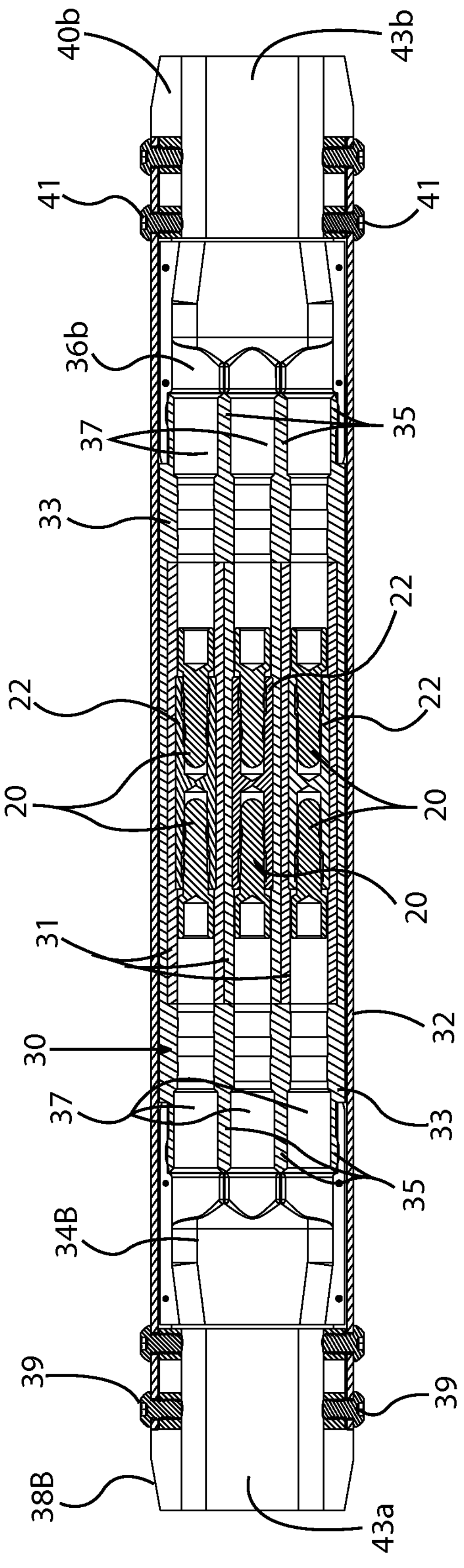
FIG. 4 depicts a top plan and cross-sectional view of the electrical connector of FIG. 3.

FIG. 3 depicts an exploded view of the electrical connector assembly 10 (connector 10, hereinafter) of FIG. 1, and FIG. 4 depicts a top plan and cross-sectional view of the connector 10. The cross-section of FIG. 4 is taken through the longitudinal center of the connector 10. The connector 10 generally includes a splice assembly 30 that is mounted within an interior region of a one-piece housing 32. The splice assembly 30 is centered along the length of the housing 32. The splice assembly 30 of the connector 10 is configured to electrically connect the cable assemblies 12A and 12B (not shown in FIGS. 3 and 4).

Figure 5:
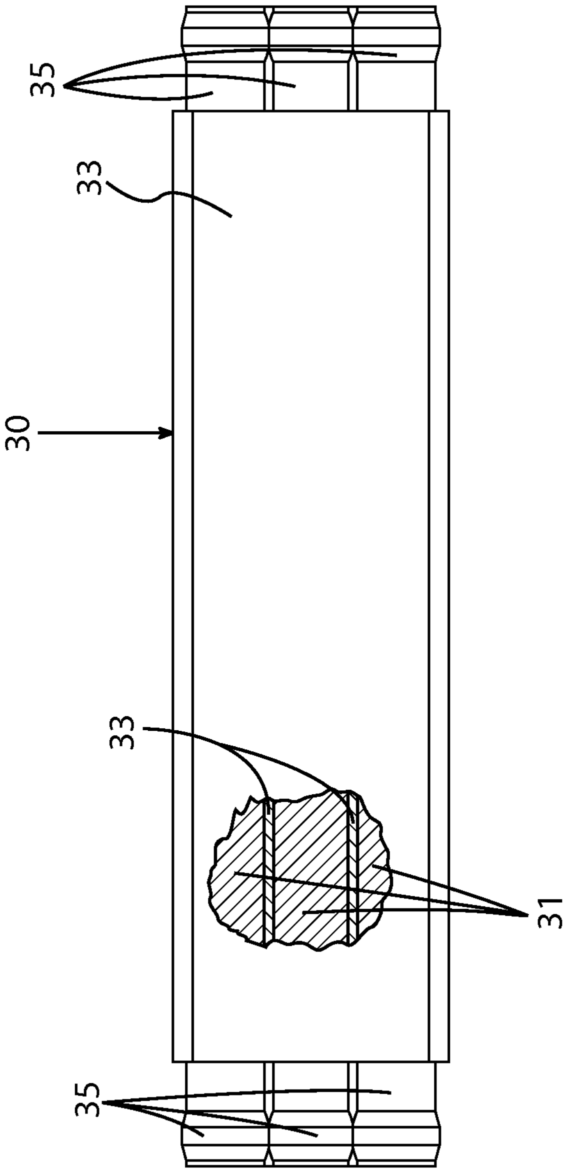
FIG. 5 depicts a top plan view of a splice assembly of the electrical connector assembly of FIG. 4, a portion of which is shown cutaway to reveal three contact assemblies.

Referring now to FIGS. 3-6B, the splice assembly 30 includes three cylindrically-shaped contact assemblies 31 that are embedded together in a substantially rectangular shaped outer shell 33 (see FIG. 5). The outer shell 33 encapsulates the three contact assemblies 31, and each contact assembly 31 encapsulates a single socket contact 22 (see also FIGS. 6A and 6B).

Referring back to FIGS. 3-5, three cylindrically-shaped ports 35 are integrally formed on each end of the outer shell 33, and internal passages 37 extend between each port 35 and a respective socket contact 22 that is embedded in the outer shell 33. The internal passages 37 provide a passageway for the insertion of a pin contact 20 onto a socket contact 22. It should be understood that the pin contacts 20 do not form part of the splice assembly 30 until they are mated with the socket contacts 22 of the splice assembly 30, as will be described in greater detail later.

Compression inserts 34*a* and 34*b* (referred to collectively as left-side inserts 34 or inserts 34) are mounted together over the ports 35 on the left end of the splice assembly 30. Similarly, compression inserts 36*a* and 36*b* (referred to collectively as right-side inserts 36 or inserts 36) are mounted together over the ports 35 on the right end of the splice assembly 30. The compression inserts 34 and 36 are positioned within the interior space of the housing 32. As best shown in FIG. 3, the top inserts 34*a* and 36*a* are mated to the bottom inserts 34*b* and 36*b*, respectively, by positioning pins extending from the mating surfaces of the inserts into holes that are defined on the mating surfaces of the inserts. The pins and pin holes also help to align the mating inserts 34 and 36 together.

As shown in FIG. 3, each insert 34 and 36 includes three semi-circular scalloped regions (see, e.g., scalloped regions 34*c*, 36*c* and 36*d*). The scalloped regions of insert 34*a* is not shown. Each scalloped region 34*c*, 36*c* and 36*d* is configured to accommodate a cylindrically-shaped port 35 of the outer shell 33 of the splice assembly 30. The compression inserts 34 and 36 compress the ports 35 of the outer shell 33 of the splice assembly 30 to limit the ingress of fluid, dirt or other contaminants. The compression inserts 34 and 36 may be composed of steel, for example.

As best shown in FIG. 4, the left-side mated inserts 34 are sandwiched between the left end of the splice assembly 30 and a mated pair of end caps 38*a* and 38*b* (referred to collectively as left-side end caps 38). Similarly, the right-side mated inserts 36 are sandwiched between the right end of the splice assembly 30 and a mated pair of end caps 40*a* and 40*b* (referred to collectively as right-side end caps 40).

Referring to FIGS. 3 and 4, a portion of the end caps 38 and 40 are positioned within the interior space of the housing 32, and a portion of the end caps 38 and 40 protrude from the housing 32. The left-side end caps 38 are mated together by tongue 38*c* and groove 38*d*, and the right-side end caps 40 are mated together by tongue 40*c* and groove 40*d*. When mated together, the left-side end caps 38 define a cable entrance opening 43*a*, and the right-side end caps 40 define a cable entrance opening 43*b*. Although not shown, the inserts 34 and the end caps 38 may be integrated together, and, likewise, the inserts 36 and the end caps 40 may be integrated together.

Threaded holes 38*e* are provided on both sides of the lower left end cap 38*b* for threadedly receiving fasteners 39, and threaded holes 40*e* are provided on both sides of the lower right end cap 40*b* for threadedly receiving fasteners 41. In assembled form, the left-side end caps 38 are mounted to the inner wall of the housing 32 by the fasteners 39 and the right-side end caps 40 are mounted to the inner wall of the housing 32 by the fasteners 41. The inserts 34 and 36 and the splice assembly 30 are sandwiched between the end caps 38 and 40.

FIG. 5 depicts a top plan view of the splice assembly 30 of the electrical connector assembly 10 of FIG. 4, a portion of which is shown cutaway to reveal three contact assemblies 31. The splice assembly 30 generally includes three cylindrically-shaped contact assemblies 31 that are embedded in a substantially rectangular-shaped outer shell 33. In other words, the outer shell 33 is molded over the contact assemblies 31.

Three cylindrically-shaped hollow ports 35 are integrally formed on the right-side end and the left-side end of the outer shell 33. Alternatively, the ports 35 may be discrete components that are either fused to the outer shell 33 or partially embedded in the outer shell 33. An internal passage 37 extends between each port 35 and a respective socket contact 22. The outer shell 33 of the splice assembly 30 is optionally composed of a neoprene material. Those skilled in the art will recognize that other materials may be utilized.

Figure 6A:
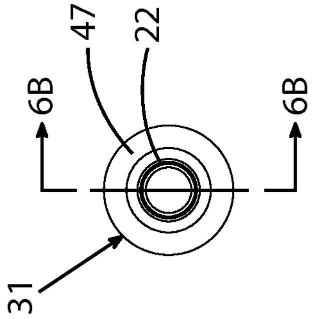
FIG. 6A depicts a side elevation view of one of the contact assemblies of the splice assembly of FIG. 5.
Figure 6B:
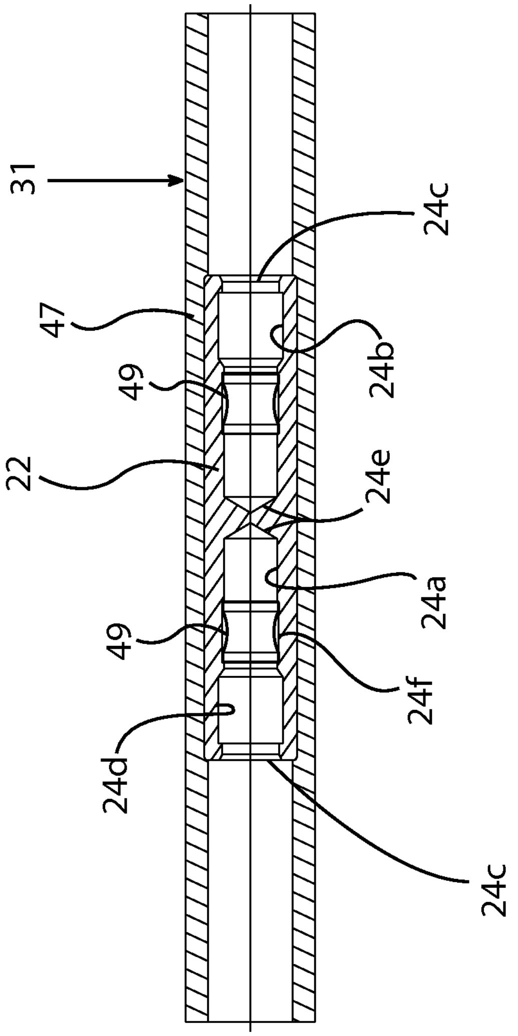
FIG. 6B depicts a cross-sectional view of the contact assembly of FIG. 6A taken along the lines 6B-6B.

FIG. 6A depicts a side elevation view of one of the contact assemblies 31 of the splice assembly 30 of FIG. 5, and FIG. 6B depicts a cross-sectional view of the contact assembly 31 of FIG. 6A taken along the lines 6B-6B. According to this embodiment, the contact assemblies 31 are all structurally and functional equivalent, however, the contact assemblies 31 may differ from each other.

Each contact assembly 31 includes a cylindrical socket contact 22 that is embedded within an outer cylinder 47. In other words, the outer cylinder 47 is molded over the socket contact 22. The length of the outer cylinder 47 is greater than the length of the socket contact 22, and the socket contact 22 is centered along the length of the outer cylinder 47. The socket contact 22 is composed of a conductive material, such as brass, gold, nickel or copper, for example. The outer cylinder 47 is composed of an insulative material, such as EPDM rubber, for example. Those skilled in the art will recognize that other materials may be utilized.

As best shown in FIG. 6B, the socket contact 22 includes two opposing bores 24*a* and 24*b* (referred to collectively as bores 24). By virtue of the conductive nature of the socket contact 22, the bores 24*a* and 24*b* are maintained in electrical continuity. The bores 24*a* and 24*b* are substantially equivalent in form and function, with the exception that the bores 24*a* and 24*b* are oriented in opposite directions along the length of the socket contact 22. Each bore 24 includes a bore opening 24*c* through which the pin contact 20 is introduced, a terminal end 24*e* and a passage that extends between the opening 24*c* and the terminal end 24*e*. A series of annular recesses are formed along the side walls of each bore 24. As will be described with reference to FIGS. 7A and 7B, each annular recess of the bores 24 serves a particular purpose.

As described in the Background Section, the lengths of the wires 14 of the cable assemblies 12A and 12B may be unequal due to manufacturing tolerances, sloppy cable termination in the field, or thermal expansion or contraction. If a particular wire 14 of a cable assembly that is connected to a connector 10 is significantly longer than the remaining wires 14 of that cable assembly, then the remaining unconnected wires of that cable assembly may be too short to reach the connector 10. Alternatively, if a particular connected wire 14 of a cable assembly that is connected to a connector 10 is even slightly shorter than the remaining wires 14 of that cable assembly, then it may be necessary to bend and stress the remaining unconnected wires of that cable assembly in an attempt to connect those unconnected wires 14 to the common connector 10. As will be described with reference to FIGS. 7A *and* 7B, the pin contacts 20 and the socket contacts 22 of the connector 10 are uniquely configured to accommodate unequal wire lengths.

Figure 7A:
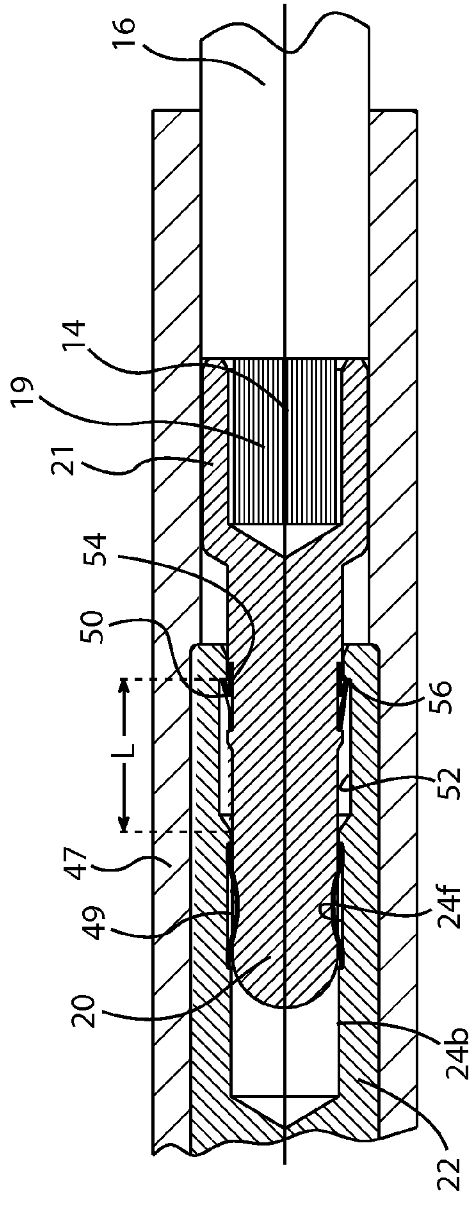
FIGS. 7A and 7B each depicts a pin contact that is crimped to an exposed wire of a cable assembly and positioned in a socket contact of the connector, wherein the pin contact is positioned in the socket at a greater depth in FIG. 7B than in FIG. 7A.
Figure 7B:
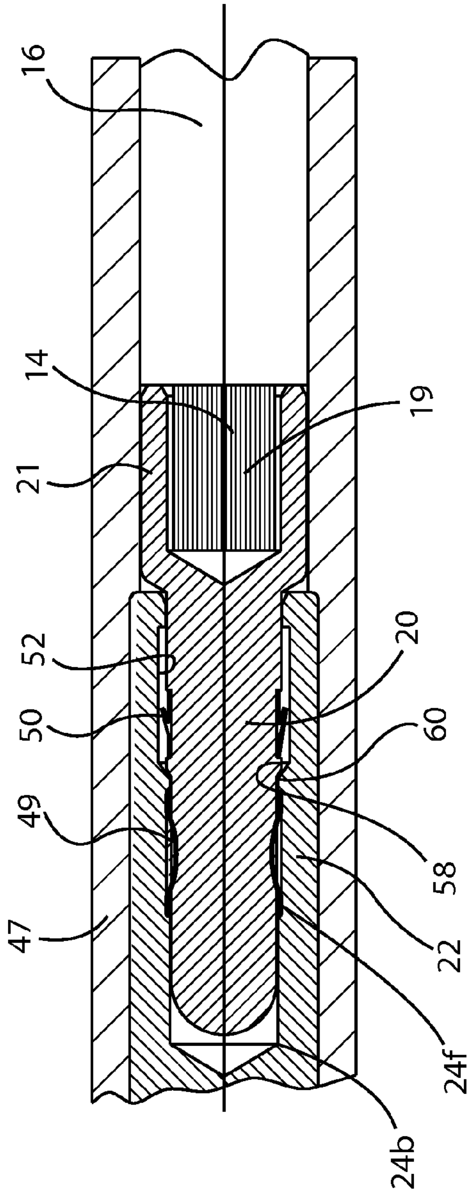

FIGS. 7A and 7B each depicts a pin contact 20 that is crimped to an exposed wire 19 of a cable assembly and positioned in the bore 24*b* of the socket contact 22 of the connector 10. Although one bore 24*b* is shown in FIGS. 7A and 7B, it should be understood that the description of bore 24*b* provided hereinafter equally applies to the bore 24*a* of the socket contact 22. Similarly, although one pin contact 20 is shown in FIGS. 7A and 7B, it should be assumed that all of the pin contacts 20 are structurally and functionally equivalent. It should be understood that all of the components that are depicted in FIGS. 7A and 7B in cross-section are actually cylindrical in shape.

The pin contact 20 is capable of translating between the initial position of FIG. 7A and the forward position of FIG. 7B by virtue of the engagement between an elongated recess 52 that is formed in a side-wall of the bore 24*b* and a spring clip 50 that is mounted on the pin contact 20. The spring clip 50 can translate along the surface of the elongated recess 52 while maintaining electrical continuity therebetween.

The elongated recess 52 extends both radially and longitudinally between opposing shoulders 56 and 60 of the bore 24*b*. The elongated recess 52 has a length 'L' to compensate for the length tolerance of the wires 14. The length of the elongated recess 52 may be any desired dimension. According to one aspect of the invention, the length is between 0.05 inches and 0.5 inches.

The spring clip 50 is fixedly positioned in a recess 54 that is formed on the outer surface of the pin contact 20. Every pin contact 20 includes a spring clip 50. The spring clip 50 is composed of a conductive, resilient and deformable material, such as spring steel.

Once the pin contact 20 is inserted into bore 24*b*, the pin contact 20 is capable of translational movement within the bore 24*b* (compare FIGS. 7A and 7B), however, the pin contact 20 can not be removed without plastically deforming the spring clip 50. In the initial position of the pin contact 20 that is depicted in FIG. 7B, the trailing edge of the protruding portion of the spring clip 50 bears on the shoulder 56 of the bore 24*b* to prevent removal of the pin contact 20 from the bore 24*b*. In the forward position of the pin contact 20 that is depicted in FIG. 7B, a radially extending and sloping shoulder 58 that is formed on the pin contact 20 bears on another sloping shoulder 60 that is formed on the bore 24*b* to prevent the pin contact 20 from moving further forward.

A spring contact 49 is non-removably mounted within a central recess 24*f* of the bore 24*b*. The spring contact 49 provides an electrical interconnection between the socket contact 22 and the pin contact 20. Unlike the spring clip 50, the spring contact 49 does not retain the pin contact 20 to the splice assembly 30. The sole function of the spring contact 49 is electrical conductivity, whereas the primary function of the spring clip 50 is retention. Every bore 24 of the splice assembly 30 includes a spring contact 49. The spring contact 49 is composed of a conductive, resilient and deformable material, such as Beryllium Copper.

According to one aspect of the invention, the connector 10 and a plurality of pin contacts 20 are provided as a kit for splicing two cable assemblies 12A and 12B together. To splice the cable assemblies 12 together, a technician first exposes the ends 19 of the wires 14 of both cable assemblies 12. The technician then positions the exposed end 19 of each wire 14 in a blind hole that is defined in the hollow end 21 of a respective pin contact 20. The technician then crimps, clamps, solders, connects, glues, adheres, or otherwise fastens, the exposed end 19 of each wire 14 to the hollow end 21 of a respective pin contact 20.

The pin contacts 20 that are connected to respective wires 14 of the cable assembly 12A are then individually fed through respective passages 37 in the left-hand side of the splice assembly 30 of the connector 10. As each pin contact 20 is inserted into through its respective passage 37, the spring clip 50 elastically deforms as it passes over the shoulder 56 of the bore 24 of the respective socket contact 22. Once the spring clip 50 clears the shoulder 56 it springs back to engages the surface of the elongated recess 52 of the bore 24. The pin contact 20 settles in position along the elongated recess 52 of the bore 24 depending upon the length of the wire 14 to which the pin contact 20 is attached. Once the pin contacts 20 are captivated in their respective socket bores 24, the cable assembly 12A is then electrically and mechanically connected to the connector 10.

Thereafter, the pin contacts 20 that are connected to respective wires 14 of the other cable assembly 12B are then individually fed through respective passages 37 in the right-hand side of the splice assembly 30 of the connector 10. As each pin contact 20 is inserted into through its respective passage 37, the spring clip 50 elastically deforms as it passes over the shoulder 56 of the bore 24 of the respective socket contact 22. Once the spring clip 50 clears the shoulder 56 it springs back to engage the surface of the elongated recess 52 of the bore 24. The individual pin contacts 20 settle in position along the elongated recess 52 of the bore 24 depending upon the length of the wire 14 to which the pin contact 20 is attached. Thereafter, the pin contacts 20 are captivated in their respective socket bores 24, and the cable assembly 12B is then electrically and mechanically connected to the connector 10 and the cable assembly 12A.

Figure 8:
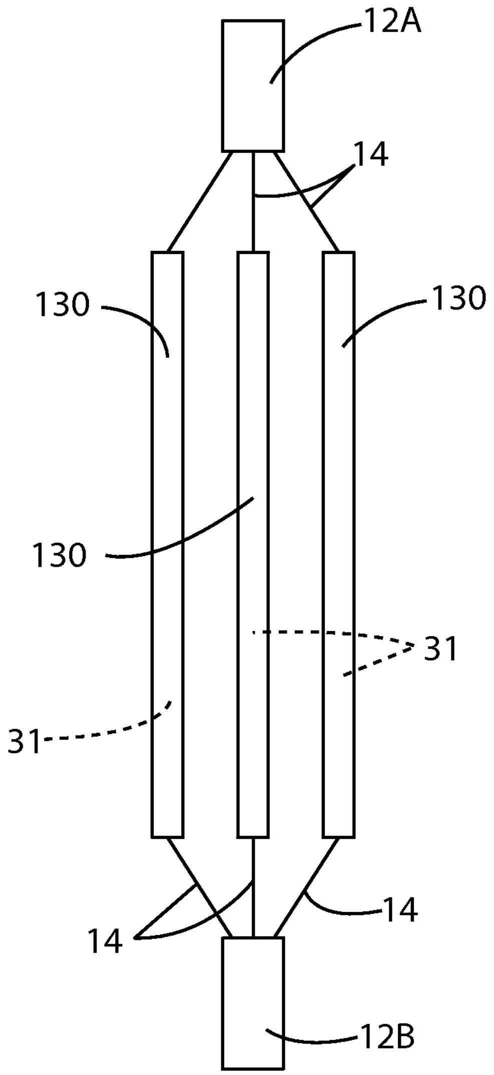
FIG. 8 depicts an alternative embodiment of a single-wire connection system that is shown schematically.

FIG. 8 depicts an alternative embodiment of a single-wire connection system that is shown schematically. In the single-wire connection system of FIG. 8, a plurality of splice assemblies 130 are used to couple the wires 14 of the mating cable assemblies 12A and 12B. It should be understood that the number of splice assemblies 130 in a single-wire connection system will vary depending upon the number of wires 14. Unlike the splice assembly 30 of FIG. 5, each splice assembly 130 of FIG. 8 has only one contact assembly 31 (see FIGS. 6A and 6B) that is embedded in an outer shell. Otherwise, the splice assemblies 30 and 130 are structurally and functional equivalent. In such single wire applications, the splice assemblies 130 accommodate extended tolerances in absolute wire length, as well as extended thermal expansion and contraction of the wires.

Although the invention is illustrated and described herein with reference to specific embodiments, the invention is not intended to be limited to the details shown. Rather, various modifications may be made in the details within the scope and range of equivalents of the claims and without departing from the spirit of the invention.

What is claimed:

1. An electrical connector that is configured to accommodate varying wire lengths of a cable assembly to which the electrical connector is non-releasably connected, said electrical connector comprising a plurality of socket contacts that are each configured to be non-releasably connected to a respective pin contact that is attached to a wire of the cable assembly, each socket contact of the connector including a bore for receiving the respective pin contact, the bore of each socket contact being configured to permit translation of the respective pin contact after the respective pin contact is non-releasably connected to its respective socket contact so as to accommodate various lengths of wire to which the respective pin contact is attached while maintaining electrical continuity between the respective pin contact of the cable assembly wire and the respective socket contact of the electrical connector, wherein when the respective pin contact is non-releasably connected to its respective socket contact, a shoulder defined in the bore prevents removal of a deformable spring clip that is connected to the respective pin contact.

2. The electrical connector of claim 1, wherein the bore of each socket contact defines a radially-extending elongated recess that is sized come into contact with the respective pin contact.

3. The electrical connector of claim 2, wherein the shoulder is defined on one end of the radially-extending elongated recess of each bore, said shoulder defining a stop for preventing removal of the pin contact that is positioned in the bore.

4. The electrical connector of claim 3, wherein another shoulder is defined on an opposing end of the radially-extending elongated recess of each bore, said another shoulder defining a stop for preventing further forward translation of the pin contact that is positioned in the bore.

5. The electrical connector of claim 2, wherein the bore of each socket contact further defines another radially-extending elongated recess for receiving a spring contact.

6. The electrical connector of claim 5 further comprising the spring contact that is fixedly positioned in said another radially-extending elongated recess, said spring contact being configured to establish electrical continuity with the pin contact that is positioned in the bore of the socket contact.

7. The electrical connector of claim 1, further comprising a plurality of pin contacts, each of which is configured to be connected to a wire of a cable assembly.

8. The electrical connector of claim 1, wherein the cable assembly is attached to an electric submersible pump/motor assembly.

9. The electrical connector of claim 1, wherein each socket contact includes two bores, one bore being configured to be connected to a pin contact that is connected to a wire of one of the cable assemblies, and the other bore being configured to be connected to another pin contact that is connected to a wire of the other cable assembly so as to establish electrical continuity between the wires of the cable assemblies.

10. The electrical connector of claim 9 further comprising an insulative layer in which the socket is encapsulated.

11. The electrical connector of claim 10 further comprising an outer shell in which the sockets and their insulative layers are all encapsulated.

12. A kit for splicing two electrical cable assemblies together comprising:

a plurality of pin contacts, each of which is configured to be connected to a wire of a cable assembly; and an electrical connector including a plurality of socket contacts that are each configured to be non-releasably connected to one of the plurality of pin contacts, each socket contact of the electrical connector including a bore for receiving a respective pin contact, the bore being configured to permit translation of the respective pin contact after the respective pin contact is non-releasably connected to its respective socket contact so as to accommodate various lengths of wire to which the respective pin contact is attached while maintaining electrical continuity between the respective pin contact of the cable assembly wire and the respective socket contact of the electrical connector, wherein when the respective pin contact is non-releasably connected to its respective socket contact, a shoulder defined in the bore prevents removal of a deformable spring clip that is connected to the respective pin contact.

13. The kit of claim 12, wherein the bore of each socket contact defines a radially-extending elongated recess that is sized to come into contact with the respective pin contact that is positioned in the bore.

14. The kit of claim 13, wherein the shoulder is defined on one end of the elongated recess of each bore, said shoulder defining a stop for preventing removal of the pin contact that is positioned in the bore.

15. The kit of claim 14 further comprising the deformable spring clip that is connected to each pin contact, wherein the shoulder of the bore elastically deforms the spring clip upon inserting the pin contact into the bore, and the shoulder prevents the removal of the spring clip, as well as the pin contact to which the spring clip is attached, from the bore.

16. The kit of claim 14, wherein another shoulder is defined on an opposing end of the elongated recess of each bore, said another shoulder defining a stop for preventing further forward translation of the pin contact that is positioned in the bore.

17. The kit of claim 12, wherein at least one of the electrical cable assemblies is attached to an electric submersible pump/motor assembly.

18. The kit of claim 12, wherein each socket contact includes two bores, one bore being configured to be connected to a pin contact that is connected to a wire of one of the cable assemblies, and the other bore being configured to be connected to another pin contact that is connected to a wire of the other cable assembly so as to establish electrical continuity between the wires of the cable assemblies.

19. The kit of claim 18, further comprising an insulative layer in which the socket is encapsulated.

20. The kit of claim 19, further comprising an outer shell which the sockets and their insulative layers are all encapsulated.

21. An electrical connector that is configured to accommodate varying wire lengths of a single wire assembly to which the electrical connector is non-releasably connected, said electrical connector comprising a socket contact that is configured to be non-releasably connected to a pin contact that is attached to a wire of the wire assembly, said socket contact of the connector including a bore for receiving the pin contact, the bore of said socket contact being configured to permit translation of the pin contact after the pin contact is non-releasably connected to the socket contact so as to accommodate various lengths of wire to which the respective pin contact is attached while maintaining electrical continuity between the pin contact of the wire assembly and the socket contact of the electrical connector, wherein when the respective pin contact is non-releasably connected to its respective socket contact, a shoulder defined in the bore prevents removal of a deformable spring clip that is connected to the respective pin contact.

* * * * *